May 16, 1961     H. EHRENS     2,984,272
SAW DEVICE
Filed April 23, 1959
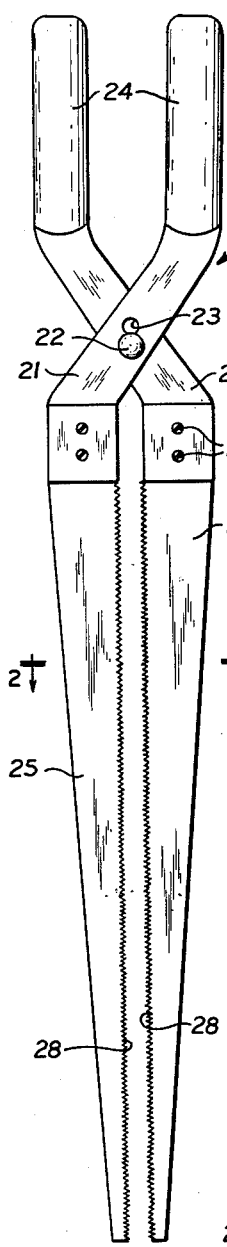
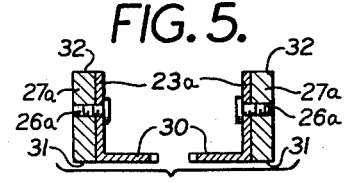
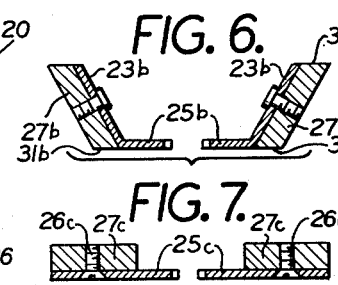
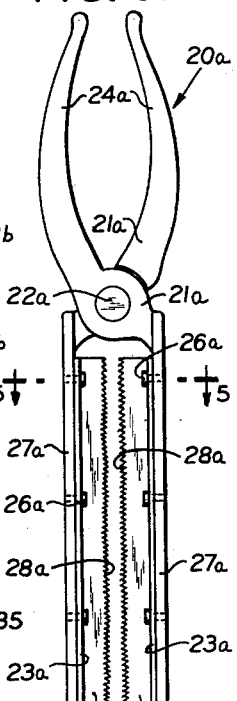
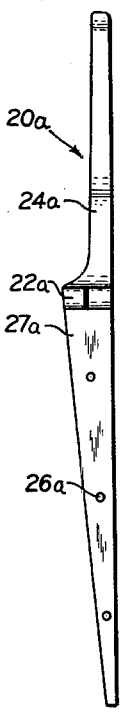
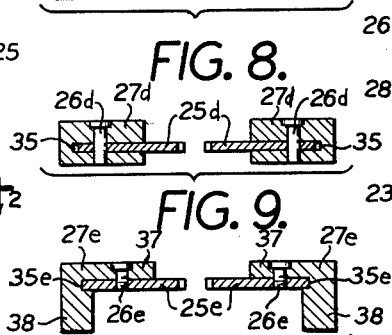
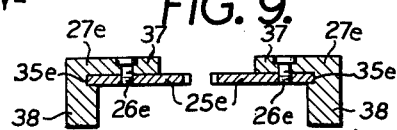
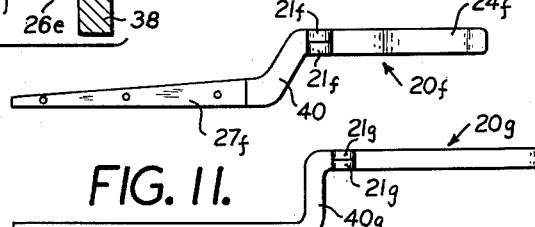
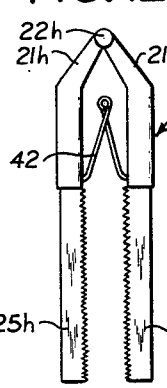
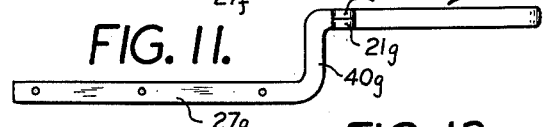
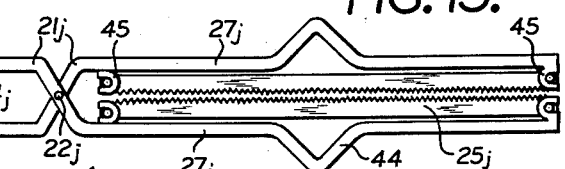
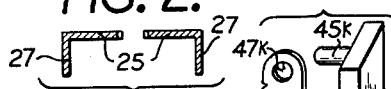
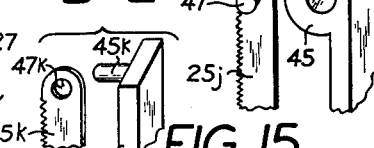
INVENTOR
HENRY EHRENS
BY
Mack & Blum
ATTORNEYS

United States Patent Office 2,984,272
Patented May 16, 1961

2,984,272
SAW DEVICE

Henry Ehrens, Cresskill, N.J., assignor to Sealed Unit Parts Co. Inc., New York, N.Y., a corporation of New York Filed Apr. 23, 1959, Ser. No. 808,405

11 Claims. (Cl. 145—31)

This invention relates generally to tools, and is especially concerned with cutting tools of the saw type.

It is one object of the present invention to provide a novel and unique saw-type cutting tool which is adapted to considerably reduce the heretofore required cutting time without the expenditure of additional energy or skill.

It is a further object of the present invention to provide a saw device of the type described which is adapted to sever or cut a projection substantially flush with the surrounding surface.

It is still another object of the present invention to provide a saw device having the advantageous characteristics mentioned in the preceding paragraphs which is extremely simple in construction, easy to use, staunch and durable in operation throughout a long useful life, and which can be economically manufactured for sale at a reasonable cost.

Other objects of the present invention will become apparent upon reading the following specifications and referring to the accompanying drawings, which forms a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 1 is a longitudinal plan view showing a saw device of the present invention;

Fig. 2 is a sectional view taken substantially along the line 2—2 of Fig. 1;

Fig. 3 is a longitudinal plan view showing a slightly modified saw device of the present invention;

Fig. 4 is a longitudinal side view of the saw device of Fig. 3;

Fig. 5 is a sectional view taken substantially along the line 5—5 of Fig. 3;

Figs. 6, 7, 8 and 9 are sectional views, similar to Fig. 5, of additional modifications of the device of the present invention;

Figs. 10 and 11 are longitudinal side views similar to Fig. 4 and showing additional modifications of the present invention;

Fig. 12 is a longitudinal plan view showing a further embodiment of the present invention;

Fig. 13 is a longitudinal plan view showing still a further embodiment of the present invention;

Fig. 14 is a partial, exploded perspective view showing in greater detail a blade fastening construction of the embodiment of Fig. 13; and Fig. 15 is a partial, exploded perspective view showing a slightly modified form of blade fastening construction.

Referring now more particularly to the drawings, and specifically to Figs. 1 and 2 thereof, a saw device of the present invention is there generally designated 20, and includes a pair of crossing pivoted levers 21 having their medial, crossing regions pivotally connected by a transverse pin 22 in a conventional slip-slot 23. Extending from one pair of ends of the levers 21, respectively, are a pair of gripping members or handles 24 adapted for manual gripping and manipulation.

Extending from the other, remaining pair of ends of the levers 21, respectively, are a pair of elongate saw blades 25. The saw blades 25 are each connected at one end to a respective lever 21 as by fasteners 26, and extend generally outward therefrom. As best seen in Fig. 2, the saw blades 25 are substantially coplanar, having their toothed edges 28 facing toward each other. Further, the saw blades 25 are swingable relative to each other with their respective levers 21 in coplanar relation to swing the toothed edges 28 toward and away from each other. Along the opposite longitudinal edge of each saw blade 25, remote from the toothed edge thereof, may be provided a reinforcing member or flange 27. The flanges 27 serve to strengthen and rigidify their respective blades 25, and are preferably located on the same side of the plane of the blades.

It will now be appreciated that the device 20 is adapted to be manually grasped at the handles 24 and manipulated to place the blades 25 on opposite sides of an article to be severed. Upon then squeezing the handles 24 and reciprocating the entire device longitudinally of the blades, sawing action will be effected on opposite sides of the article being sawed. As the reinforcing flanges 27 are on the same side of the plane of blades 25, it is also apparent that the blades may be placed in facing engagement with the surface surrounding a projection to be severed, and the projection thus severed substantially flush with the surrounding surface.

In Figs. 3–5 are illustrated a modified embodiment of saw-type cutting tool generally designated 20a. The saw device 20a includes a pair of crossed longitudinally extending levers 21a pivotally connected together at their cross-over point by a transverse pivot pin 22a. The levers 21a are each provided at one end with a handle or hand grip extension 24a which are shown as extending generally longitudinally of each other away from the pivotal connection 22a.

On the other ends of the levers 21a are provided a pair of elongate blade mounting extensions or arms 27a. That is, the extensions 27a each extend from a respective lever 21a, substantially longitudinally of each other. Put in other terms, in addition to extending longitudinally, the levers 21a also extend generally transversely (reference numeral 27a) in one direction, so as to oppose each other, beyond the pivot. The extensions 27a are generally straight and may taper or decrease in cross section, as seen in Fig. 4.

Arranged between the extensions 27a, and respectively carried by the latter, are a pair of saw blades 25a. The saw blades are disposed substantially coplanar with each other, having their toothed edges 28a proximate or facing toward each other, and are each provided along its longitudinal edge spaced from the toothed edge with a longitudinally extending, coextensive flange 23a. The flange 23a of each saw blade 25a is detachably, but fixedly secured in facing engagement with the adjacent extension 27a, as by a plurality of threaded fasteners 26a. The abutting faces of flange 23a and lever extension 27a are defined as their connection faces. As best seen in Fig. 5, the saw blades 25a are substantially coplanar with each other, having their under or non-flanged surfaces 30 substantially flush with each other and with the adjacent under edges 31 of the extensions 27a. The above mentioned taper of the extensions 27a may be achieved with the under edges 31 of the extensions substantially normal to the pivotal axis or pin 22a, and with the upper extension edges 32 converging toward the respective under edges in the longitudinally outward direction. The saw blade flanges 23a may have their upper edges longitudinally outward convergent toward the underside of the blade, conformably with the upper extension edges 32.

It will now be appreciated that the saw blades 25a are swingable in coplanar relation toward and away from each other with their toothed edges 28a facing toward each other, and adapted to be manipulated by means of the handles 24a for sawing engagement with opposite sides of an article to be severed. Also the extensions 27a, to which the saw blades 25a are detachably fixed, serve to rigidify and reinforce the blades against flexing and the like. As the flanges 23a and extension arms 27a are entirely above the under-blade surfaces 30, nothing projecting below the latter surfaces, it is obvious that the saw blades may be employed to sever a projection substantially flush with the surrounding area. Also, the outward taper of the extensions 27a and flanges 23a enables the saw blades 25a to enter into relatively small spaces.

In the modification of Fig. 6, the saw blades 25b are substantially coplanar with each other, and have their longitudinal flanges 23b extending upward and diverging away from each other. The blade carrying and reinforcing extensions 27b are respectively secured in facing engagement with the outer surfaces of the obliquely disposed flanges 23b, and are of generally parallelogram cross sectional configuration, so that the lower edges 31b of the extensions are substantially flush with the under surfaces of the blades 25b, and the upper edges of the flanges 23b. This construction possesses the above discussed advantageous features of the embodiment of Figs. 3–5, and may be desirable in certain instances when a larger space is required between the saw blades' flanges.

In the embodiment of Fig. 7, the saw blades 25c are in coplanar relation and are formed without reinforcing flanges. The carrier extensions 27c are respectively secured to the saw blades 25c in facing engagement with the upper coplanar surfaces of the latter, as by fasteners 26c. By this construction, the extensions 27c effectively reinforce their respective blades 25c in the plane of the blades, and the combined blades and extensions may be of considerably reduced height. Also, the underside of the blades 25c is clear for severance of a projection flush with the surrounding surface.

A further embodiment is illustrated in Fig. 8, wherein a pair of longitudinally disposed extensions 27d are provided on their facing sides with facing, longitudinally extending grooves 35 each receiving a respective saw blade 25d. The saw blades 25d are secured in the grooves 35 of the extensions 27d by fasteners 26d, and thus carried for swinging movement toward and away from each other in substantially coplanar relation. By this construction, the saw blades are effectively reinforced on both surfaces thereof.

In the embodiment of Fig. 9, a pair of blade carrying extensions 27e are provided, which are of angulate cross sectional configuration, each including a flange 37 and a flange 38. The flanges 37 of the two extensions 27e are substantially coplanar with each other, while the flanges 38 extend from the distal or outer edges of the coplanar flanges. It will be noted that each of the flanges 38 is provided with a longitudinally extending slot or groove 35e substantially flush with the underside of its adjacent flange 37. The saw blades 25e are substantially flat and secured in facing engagement with the undersides of the flanges 27, respectively, having their outer or distal edges received in the adjacent groove 35e. Suitable fasteners 26e may extend through the flanges 37 to secure the blades 25e in position. This embodiment provides a high degree of blade reinforcement while affording a considerable space between the flanges 38 of the extensions 27e.

In the embodiment of Fig. 10, the saw device 20f may be similar to the saw device 20a, however the levers 21f are each provided with obliquely downwardly extending portions 40 interposed between the cross-over region and the extensions 27f. By this construction, the extensions 27f and the blades carried thereby are offset from the handles 24f, so that the blades swing in a plane generally parallel to but spaced from that of the handles.

In the embodiment 20g of Fig. 11, the levers 21g are provided, respectively, with downwardly offsetting portions 40g interposed between each lever and its blade carrying extension 27g. The offsetting portions 40g are disposed generally normal to the parallel spaced planes of the extensions 27g and the handles 20g. In this embodiment, the extensions 27g are shown as of constant depth throughout their length, while the extensions 27f are shown as being outwardly tapering or gradually reducing in depth. The offsetting lever portions 40g may be desirable under conditions of very limited accessibility.

A saw device 20h is illustrated in Fig. 12, wherein the levers 21h are crossed and pivoted at one pair of ends, as by the pivotal connection 22h. From the other pair of lever ends extend saw blades 25h. If desired, a resilient member or spring 42 may be interposed between and connected to the levers 21h to resiliently urge the latter apart. In this embodiment, the levers themselves define the handles or hand grip means, each lever having one end connected to the pivotal joint 22h, and being provided at its other end with a saw blade 25h.

In the embodiment of Figs. 13 and 14, a pair of crossing levers 21j are pivotally connected at their crossing region by a pivot pin 22j. Extending from one pair of ends of the levers 21j are handles or hand grip members 24j. A pair of blade carriers or extensions 27j extend from the other pair of ends, respectively, of the levers 21j. The extensions 27j may each be provided medially between its ends with outwardly deformed region 44 affording a slight degree of resilience to the extensions. At spaced locations on the inner side of each extension 27j, adjacent to opposite ends thereof, are provided a pair of oppositely downwardly facing hooks 45. Such a hook is seen in detail in Fig. 14. A slot 46 may be formed in each hook 45 extending therethrough longitudinally of the extensions 27j, and in alignment with each other.

A blade 25j is carried by each extension 27j, and may be provided at each end with a cross pin 47. Thus, opposite ends of the blades 25j are engageable in respective hook slots 46, with the cross pins 47 each received in the respective hook. By this construction, the hooks 45 and cross pins 47 define means for releasably fastening the blades 25j to the extensions 27j. Of course, the resilient deflectability of the extensions 27j facilitates interengagement of the fastening means 45, 57.

An additional interengageable, releasable fastening means is illustrated in Fig. 15, wherein an extension 27k carries a transverse projection or pin 45k, and a blade 25k is provided with a through opening or aperture 47k adjacent to the blade and for reception of the pin 45k. Thus, the fastening means 45k, 47k may be substituted for the fastening means of Figs. 13 and 14, if desired. Also, additional types of fastening means may be employed, if desired.

From the foregoing, it is seen that the present invention provides a saw-type cutting tool which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A saw device comprising a pair of generally longitudinally extending levers, a transverse pivot connecting said levers, a pair of generally longitudinally extending sawblades, each said blade having a respective blade connection face, each said lever having a respective lever connection face which is coextensive in length with said blade connection face, and means clampingly securing a respective blade to a respective lever with their respective connection faces in flush abutment with each other, said blades having proximate toothed edges located in substantially a common plane and located for swinging movement of said toothed blade edges toward and away from each other upon pivoting of said levers, whereby said device is adapted for releasable sawing engagement with opposite sides of an article to be sawed.

2. A saw device according to claim 1, said levers extending generally transversely as well as longitudinally, said blades having generally transverse flanges, said blade connection faces being the outer faces of said flanges, said connecting means comprising releasable fasteners securing said blade connecting faces to said levers in said flush abutment therewith.

3. A saw device according to claim 2, said blades being generally co-planar, and said flanges being substantially at right angles thereto.

4. A saw device according to claim 2, said blades being co-planar, and said flanges being outwardly inclined in the direction away from said blades.

5. A saw device according to claim 1, said levers also extending laterally and being co-planar.

6. A saw device according to claim 5, said blades being co-planar and being secured along their length to respective lateral faces of said levers.

7. A saw device according to claim 5, said blades being co-planar, said levers having opposing grooves in which said blades are releasably received.

8. A saw device comprising a pair of generally longitudinally extending levers, a transverse pivot connecting said levers, said levers also extending generally transversely in one direction beyond said pivot, a pair of generally longitudinal saw blades each having a lateral flange and a generally transverse flange, means releasably connecting said transverse flanges to the respective inner faces of the transverse portions of said levers, the inner edges of said lateral flanges being toothed, said blades being located for swinging movement of said toothed blade edges toward and away from each other upon pivoting of said levers, whereby said device is adapted for releasable sawing engagement with opposite sides of an article to be sawed.

9. A saw device according to claim 8, said transverse flanges being transversely tapered in the direction away from said pivot.

10. A saw device according to claim 8, the bottom of said levers being planar.

11. A saw device according to claim 8, the transverse portions of said levers being offset below said pivot and below the other portions of said levers.

References Cited in the file of this patent

UNITED STATES PATENTS

| | | |
|---|---|---|
| 1,702,801 | Smith | Feb. 19, 1929 |
| 2,552,652 | Stasiek | May 15, 1951 |

FOREIGN PATENTS

| | | |
|---|---|---|
| 53,976 | Sweden | Mar. 7, 1923 |
| 40,963 | Germany | Sept. 24, 1887 |
| 183,264 | Austria | Sept. 26, 1955 |